(No Model.)
J. T. BARNES.
ROAD CART.
No. 264,999. Patented Sept. 26, 1882.
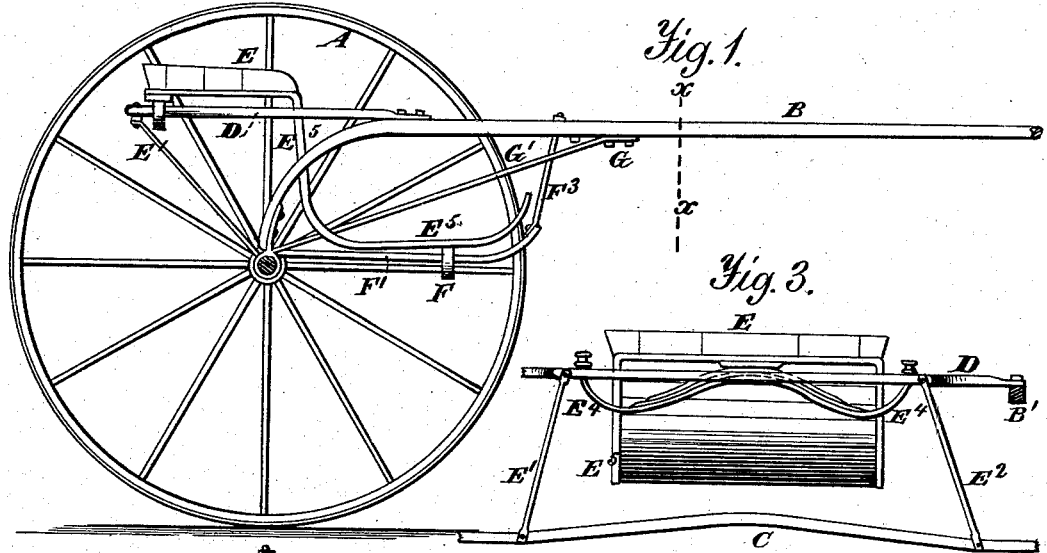
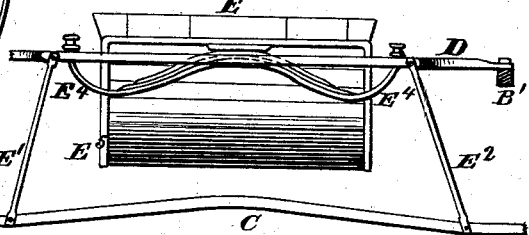
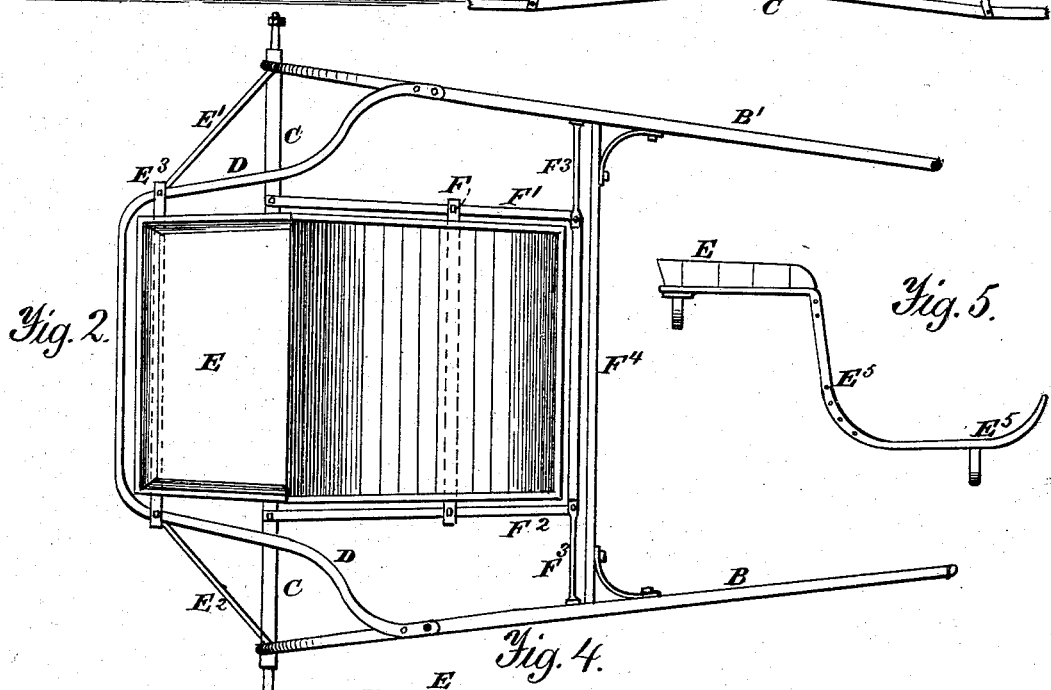
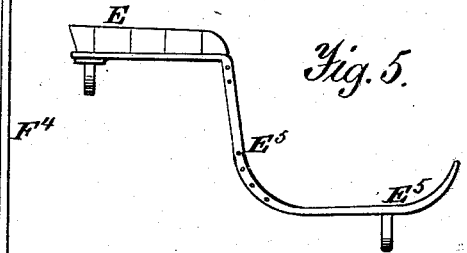
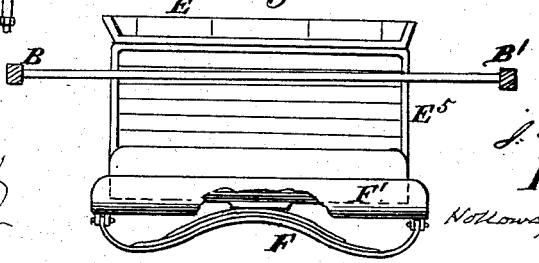
Witnesses.
A. Ruppert
Geo. Bacon
J. T. Barnes
Inventor:
Holloway & Blanchard
Attys

UNITED STATES PATENT OFFICE.

JOHN T. BARNES, OF RUSHVILLE, INDIANA.

ROAD-CART.

SPECIFICATION forming part of Letters Patent No. 264,999, dated September 26, 1882.

Application filed July 24, 1882. (No model.)

*To all whom it may concern:*

Be it known that I, JOHN T. BARNES, a citizen of the United States, residing at Rushville, in the county of Rush and State of Indiana, have invented certain new and useful Improvements in Road-Carts, of which the following is a specification, reference being had therein to the accompanying drawings.

My invention relates to improvements in road-carts and other wheeled vehicles; and the object of my improvement is to provide a new combination of devices for constituting such vehicles. I attain this object by the devices and combinations thereof illustrated in the accompanying drawings, in which—

Figure 1 is an elevation of my improved vehicle, showing one of the wheels, the body, one shaft, and the braces for supporting the parts. Fig. 2 is a plan view, showing the parts above enumerated and, in addition, the axle and the combination of all the parts. Fig. 3 is a rear view, showing the axle, the rear supporting-bar and its braces, the seat, and its suspending-spring. Fig. 4 is a sectional elevation on line $x$ $x$ of Fig. 1, showing the front supporting-spring; and Fig. 5 is a side elevation of the body and seat of the vehicle.

Similar letters refer to similar parts throughout the several views.

In constructing vehicles of this type there are provided two carrying-wheels, A, of such diameter as to cause the shafts B B' to be nearly on a level while it is being drawn by an animal of ordinary size.

The axle C may be curved upward, as shown in Fig. 3, or it may be straight between the points where the shafts are attached to it, its outer ends being provided with arms for the reception of the wheels in the ordinary manner.

To the shafts, at a point forward of the axle, there is attached bar D, of iron or of bent wood, which is of such form as to cause a portion of it to pass to the rear of the seat E, as shown in Fig. 2, it being supported by braces E' and $E^2$, the lower ends of which are attached to the axle at the points where the shafts are united thereto. Extending from one arm of the bar D to the other there is a bar, $E^3$, to which the ends of the rear carrying-spring, $E^4$, are attached, as shown in Fig. 3. Upon this spring that portion of the body which constitutes the seat rests, its sides being curved downward, as shown at $E^5$ in Fig. 5, its lower surface resting upon spring F, which is suspended from bar F' $F^2$, which extends from the axle forward to a cross-bar, $F^3$, (shown in Fig. 2,) which thus becomes the supporting-bar for the front end of the body.

Just forward of the bar $F^3$ there is another cross-bar, $F^4$, the object of which is to form an additional support to the shafts, a curved lever extending therefrom to the cross-bar, as shown.

For the purpose of further supporting the shafts, there is connected to their under surface at G braces G', the rear ends of which are attached to the axle by bolts or otherwise.

By adopting this method of constructing vehicles I am enabled to produce a light and very inexpensive article, which is very convenient for physicians and other people, and which can be used in all kinds of weather and whether the roads are bad or good.

Having thus described my invention, what I claim, and desire to secure by Letters Patent, is—

In a two-wheeled vehicle, the combination of the shafts B B', axle C, bent bar D, spring $E^4$, curved body and seat E $E^5$, spring F, and bars F', $F^2$, and $F^3$, the parts being arranged substantially as set forth, and for the purpose specified.

In testimony whereof I affix my signature in presence of two witnesses.

JOHN T. BARNES.

Witnesses:
 JOSEPH F. JOHNSON,
 ROBERT W. PATTON.